A. E. STACHEL.
TIRE HEATER.
APPLICATION FILED MAR. 17, 1913.
1,082,367.
Patented Dec. 23, 1913.
2 SHEETS—SHEET 1.
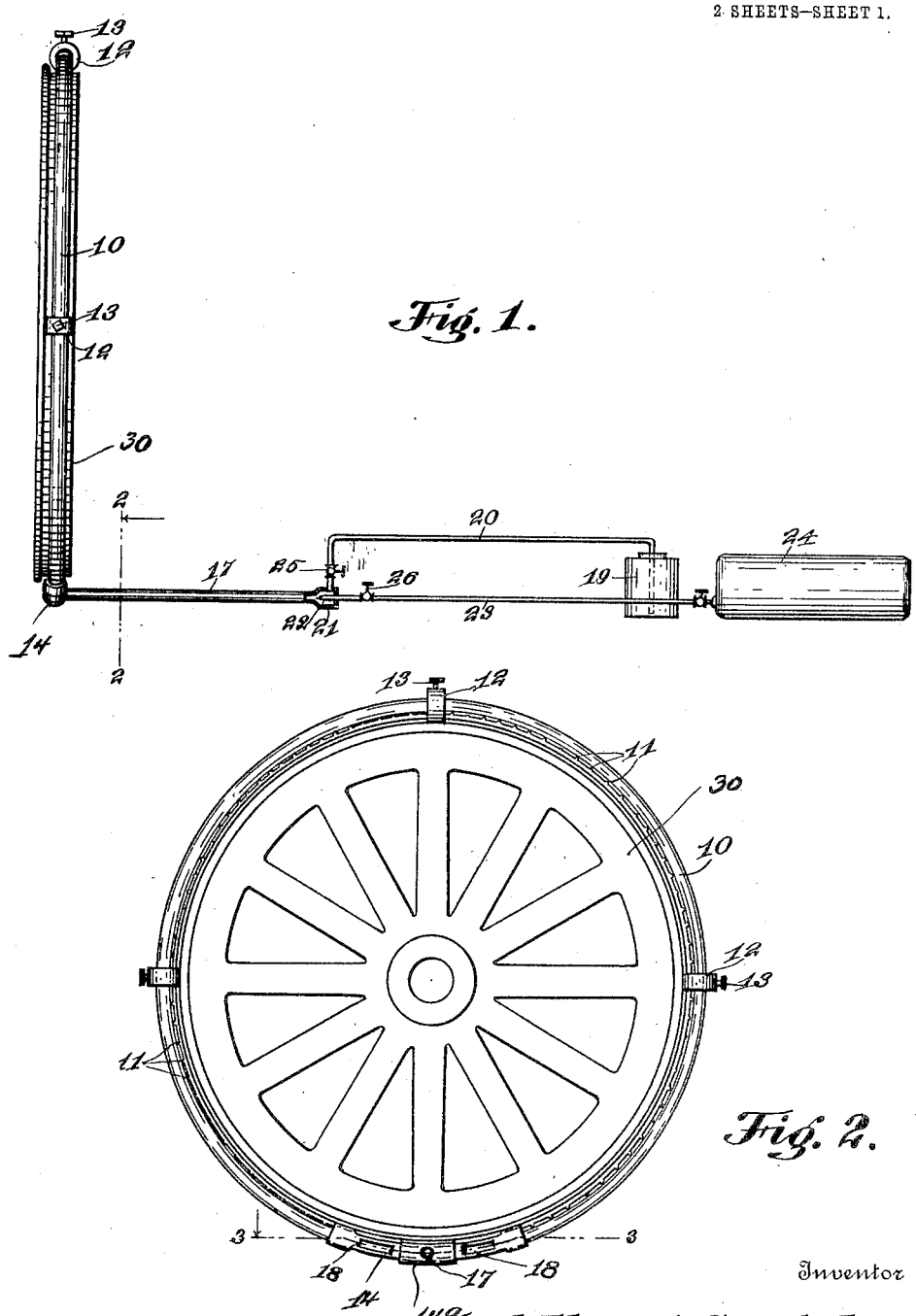
Witnesses
H. G. Batchelor
S. J. Lehrer
Inventor
Arthur E. Stachel.
By Eugene L. Ross
Attorney

A. E. STACHEL.
TIRE HEATER.
APPLICATION FILED MAR. 17, 1913.

1,082,367.

Patented Dec. 23, 1913.
2 SHEETS—SHEET 2.

Witnesses

Inventor
Arthur E. Stachel.
By
Attorney

UNITED STATES PATENT OFFICE.

ARTHUR E. STAUDE, OF CHICAGO, ILLINOIS.

TIRE-HEATER.

1,682,367.     Specification of Letters Patent.     Patented Dec. 28, 1918.

Application filed March 17, 1925. Serial No. 781,123.

*To all whom it may concern:*

Be it known that I, ARTHUR E. STAUDE, a citizen of the United States, residing at Chicago, in the county of Cook and State of Illinois, have invented certain new and useful Improvements in Tire-Heaters, of which the following is a specification.

This invention relates to devices for heating the tires of car, locomotive and other wheels to expand the same for various purposes, such as removal from the wheel or placement thereon, shimming, etc., and its object is to provide a heater of this kind which is simple in construction and economical in operation, and also to provide means for adjusting the heater relative to the tire.

Other objects and advantages of the invention will be pointed out in the detailed description appearing hereinafter.

In order that the invention may be better understood, reference is had to the accompanying drawings in which—

Figure 3:
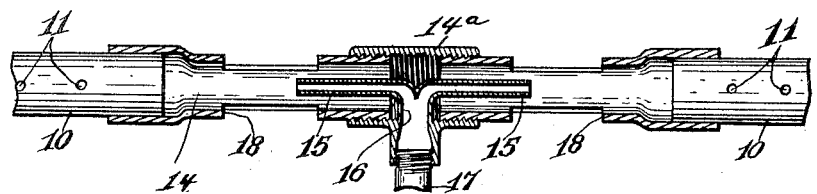
Figure 4:
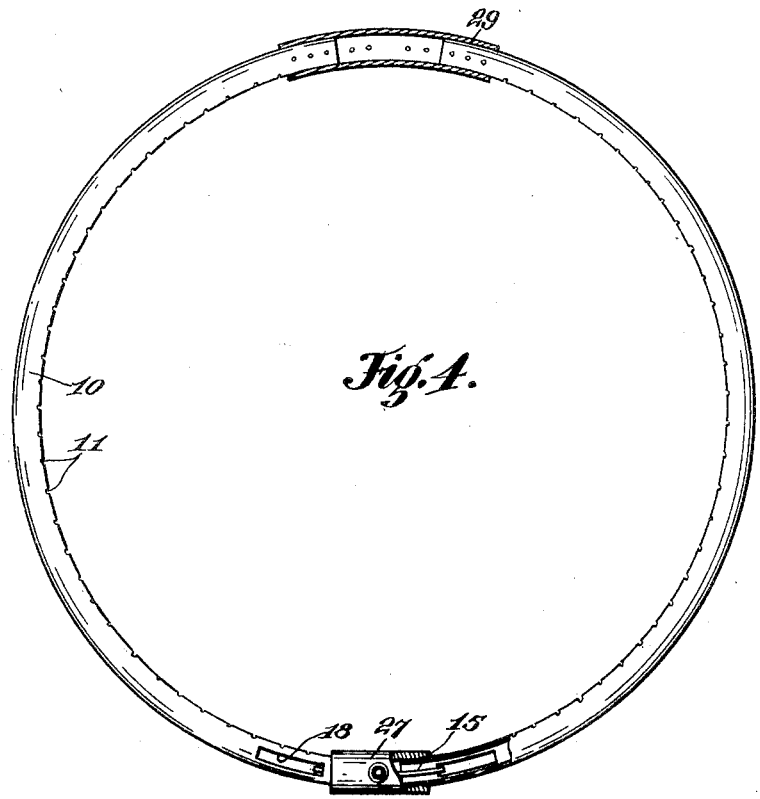

Figure 1 is an edge view of the burner showing the same in position on a wheel. Fig. 2 is an elevation, partly in section, on the line 2—2 of Fig. 1. Fig. 3 is an enlarged sectional detail on the line 3—3 of Fig. 2. Fig. 4 is an elevation, partly in section, showing a modification.

As shown in the drawings, the burner is an annular pipe 10 which is adapted to be placed around the wheel so as to encircle the tire thereof. The burner is designed for kerosene or other liquid fuel which has been vaporized, and the inner periphery, or that portion of the pipe which is directly opposite the periphery of the tire, has burner apertures 11, where the vapor is ignited and burns. The pipe is not in contact with the tire, but is held in spaced relation therewith by means of spacing collars 12 which are slidably mounted on the pipe and locked in place thereon by set screws 13. These collars are adjustable on the pipe, so that by slipping them around, certain portions of the pipe may be brought closer to the tire in order to intensify the application of the heat at any point on the tire.

There is a gap in the burner pipe 10 to receive a mixing chamber 14 into opposite ends of which the two ends of the burner pipe are fitted and secured. The mixing chamber is in two sections which are connected by a T-coupling 15, the latter having a nozzle for discharging vaporized liquid fuel through the mixing chamber into the two ends of the burner pipe. The nozzle is T-shaped and has its two lateral branches 16 pointing in opposite directions so as to discharge into the respective ends of the burner pipe. The other, or intermediate branch of the nozzle, extends from the corresponding branch of the T-coupling, and to said branch of the T-coupling is connected a vapor conducting pipe 17. In the mixing chamber 14 are air inlet slots or apertures 18.

At 19 is shown a reservoir for the kerosene or other liquid fuel. A pipe 20 leads from the reservoir to an injector casing 21 to the outlet of which the pipe 17 is connected. An injector nozzle 22 extends into the casing 21 and discharges in the direction of its outlet. The nozzle 22 is connected by a pipe 23 to a suitable source 24 of compressed air. In the pipe 20 is a valve 25, and the pipe 23 has a valve 26.

In operation, the valves 25 and 26 being opened, liquid fuel is injected into the pipe 17 and discharged from the nozzle branches 16 through the mixing chamber 14 and into the burner pipe 10. The fuel is reduced to a fine spray or vapor and upon being ignited, it burns at the apertures 11. An additional air supply is afforded by the apertures 18. The vapor may be ignited at the nozzle or at the burner apertures.

The apparatus is very neat, and there is no pressure at the burner. The reservoir 19, thereby lessening the danger of explosions. The additional air supply through the apertures 18 insures a proper mixture of air and vapor, and produces a highly combustible vapor which burns freely with an intense heat, and enables the tire to be quickly heated.

Fig. 4 shows a slight modification. The burner pipe 10 is in two sections which are connected at one end by T-coupling 27, into the ends of which the respective sections are screwed before they are bent into shape, and at the other end by a coupling sleeve 28, the connection with the latter being an adjustable one, so that the burner pipe may be expanded or contracted and thus adjusted to wheels of different diameters. The coupling 27 contains a fuel nozzle having branches 15 as in the first described structure. The same adjustment in the first described structure is effected by adjustably connecting the burner pipe to the mixing chamber.

Figs. 1 and 2 show the manner in which the burner is used, the wheel from which the tire is to be removed being indicated at 30.

I claim:

1. The combination of an annular burner pipe having a gap, a mixing chamber in the gap, the ends of the burner pipe being connected to opposite ends of the mixing chamber, a nozzle in the mixing chamber and having branches discharging in the direction of the ends of the burner pipe, a source of liquid fuel supply, an injector connected to said supply, and a connection between the aforesaid nozzle and the outlet of the injector.

2. The combination of an annular burner pipe having a gap, a mixing chamber in the gap, the ends of the burner pipe being connected to opposite ends of the mixing chamber, and said chamber being in sections, a T-coupling connecting the sections, and a nozzle in the coupling, said nozzle having branches discharging in the direction of the ends of the burner pipe.

In testimony whereof I affix my signature in presence of two witnesses.

ARTHUR E. STACHEL.

Witnesses:
H. G. BATCHELOR,
S. J. LEHRER.